INVENTOR
H. S. McDONALD
BY A. E. Hirsch Jr.
ATTORNEY

Oct. 29, 1963 H. S. McDONALD 3,109,142

APPARATUS FOR ENCODING PITCH INFORMATION IN A VOCODER SYSTEM

Filed Oct. 6, 1960 4 Sheets-Sheet 2

INVENTOR
H. S. McDONALD
BY
G. E. Hirsch Jr.
ATTORNEY

QUANTIZED MARKER PULSES

OUTPUT PULSE OF MULTIVIBRATOR 232

OUTPUT PULSE OF MULTIVIBRATOR 233

QUANTIZED MARKER PULSES PASSED BY GATE 231

QUANTA AND CLOCK PULSES

PREFRAME PULSE

FRAME PULSE

COUNT CONDITION OF COUNTER 282

INVENTOR
H. S. MCDONALD
BY
A. E. Hirsch Jr.
ATTORNEY

INVENTOR
H. S. McDONALD
BY G. E. Hirsch Jr.
ATTORNEY

United States Patent Office 3,109,142
Patented Oct. 29, 1963

3,109,142

APPARATUS FOR ENCODING PITCH INFORMATION IN A VOCODER SYSTEM

Henry S. McDonald, Murray Hill, N.J., assignor to Bell Telephone Laboratories, Incorporated, New York, N.Y., a corporation of New York Filed Oct. 6, 1960, Ser. No. 61,011
11 Claims. (Cl. 325—38)

This invention relates to narrow-band speech transmission systems, and in particular to improving the naturalness of speech produced by such systems.

Narrow-band speech transmission systems such as the channel vocoder decribed by H. W. Dudley in Patent 2,151,091, March 21, 1939, transmit the information content of wide-band speech waves in the form of a number of narrow-band control signals. In the channel vocoder, one of these control signals conveys information regarding the fundamental pitch frequency characteristic of the talker's voice. A widely used device from which a vocoder pitch control signal is derived is a pitch detector of the type described by O. O. Gruenz, Jr., and L. L. Schott in volume 21 of the Journal of the Acoustical Society of America, page 487 (1949). A pitch detector generates a marker pulse indicating the commencement of each period of a voiced sound, and the repetition rate of the marker pulses is equal to the fundamental pitch frequency of the sound. The marker pulses are encoded in analogue form for narrow-band transmission by a low-pass filter that averages the energy of the pulses to produce a direct-current voltage whose magnitude is proportional to the fundamental pitch frequency. An important feature of the present invention is the discovery that a significant improvement in the naturalness of vocoder speech is achieved by incorporating in the pitch control signal a greater amount of the pitch information contained in the marker pulses than is achieved by the analogue encoding process.

It is a specific object of this invention to improve the naturalness of vocoder speech by increasing the information content of a vocoder pitch control signal derived from the marker pulse output of a pitch detector.

This invention recognizes that the information content of the marker pulse output of a pitch detector of the type described above resides in the times of occurrence of the marker pulses as well as in the energy of the marker pulses. This invention also recognizes that in order to extract the greatest amount of information from the marker pulses, the information content of each marker pulse, as represented by its time of occurrence, must be individually transmitted and not averaged with the information content of other marker pulses.

Accordingly, it is a specific object of the present invention to transmit as a pitch control signal the individual times of occurrence of the pitch marker pulses.

In this invention, the time of occurrence of each marker pulse is obtained by time quantizing each marker pulse, that is, from each marker pulse there is derived a time-quantized pulse that occurs at a standard clock time. Standard clock times are measured by clock pulses that divide the real time scale into intervals or quanta of uniform, predetermined lengths, and for each marker pulse there is generated a time-quantized pulse in coincidence with the first clock pulse that follows each marker pulse. It is this train of quantized pulses derived from the original marker pulses which is individually coded and transmitted to form the vocoder pitch control signal of the present invention. By making the time quanta sufficiently small, the time of occurrence of each marker pulse is accurately preserved without introducing noticeable quantizing distortion.

Although the quantized marker pulses require a substantially smaller transmission channel capacity than the original marker pulses, direct transmission of the quantized marker pulses is unfeasible from the standpoint of economy of transmission channel capacity, due to the high pulse rate of the quantized marker pulses.

Accordingly, it is a specific object of this invention to conserve transmission channel capacity by transmitting the quantized marker pulses in coded form at a relatively slow pulse rate.

In this invention, the train of quantized pulses is divided into frames of equal length, as measured by a preselected number of time quanta. For each frame there is derived a pulse code indicating whether or not a quantized marker pulse occurred in the frame, and if a quantized marker pulse did occur, its exact location within the frame. The pulse code derived for each frame serves as the pitch control signal of this invention. The channel capacity necessary to transmit the code pulse is small compared to that required to transmit the uncoded quantized marker pulses, since the number of code pulses per frame is small compared to the number of quanta within each frame. At the receiver station, the pitch control signal is decoded to generate a train of artificial marker pulses whose repetition rate closely follows the repetition rate of the original marker pulses produced by the pitch detector at the transmitter station. As a result of the greater amount of pitch information conveyed, artificial speech reproduced from the pitch control signal of this invention is considerably superior in naturalness to that produced from analogue pitch control signals of the type described above.

Although the length of the frames is chosen to prevent the occurrence of more than one marker pulse per frame under normal conditions, occasionally a spurious marker pulse is generated as a result of an error made by the pitch detector. When encoded in analogue form, these spurious marker pulses cause perceptible errors in the pitch of vocoder speech, thereby imparting an unnatural sound to such speech.

It is a further object of this invention to improve the naturalness of vocoder speech by suppressing spurious marker pulses produced by a pitch detector.

In the present invention, the presence of a first quantized marker pulse within a frame stops the encoding apparatus of this invention until the beginning of the next frame, thereby preventing the encoding of subsequent marker pulses occurring within the same frame. Since the marker pulses are almost periodic, it is highly probable that subsequent marker pulses occurring within a frame are spurious and therefore should be suppressed.

As a further protection against spurious marker pulses, this invention provides a guard circuit to prevent the encoding of quantized marker pulses following a preceding quantized marker pulse within a predetermined time interval. The guard circuit contains a gate which is disabled by a first quantized marker pulse to block succeeding spurious quantized marker pulses until the termination of the predetermined time interval. The predetermined time interval is independent of where the first quantized marker pulse occurs within a frame, thereby ensuring a minimum time spacing between adjacent artificial marker pulses reconstructed at the receiver station from the transmitted pitch control signal. The train of artificial marker pulses thus derived at the receiver station is free of spurious pulses and provides a highly accurate source of pitch information for the artificial speech to be reconstructed.

The invention will be more fully understood from the following detailed description of illustrative embodiments thereof taken in connection with the appended drawings, in which.

Figures 3A, 3B, 3C:
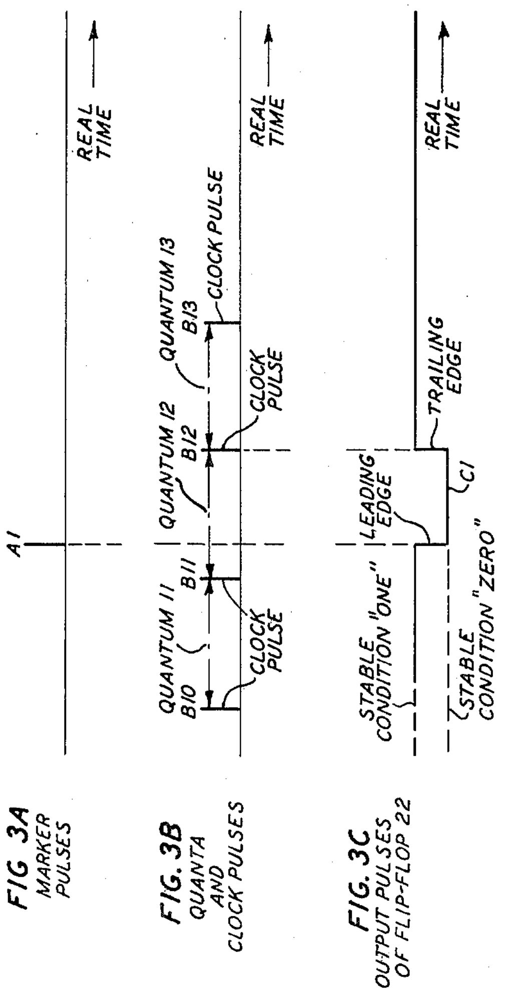
Figure 2:
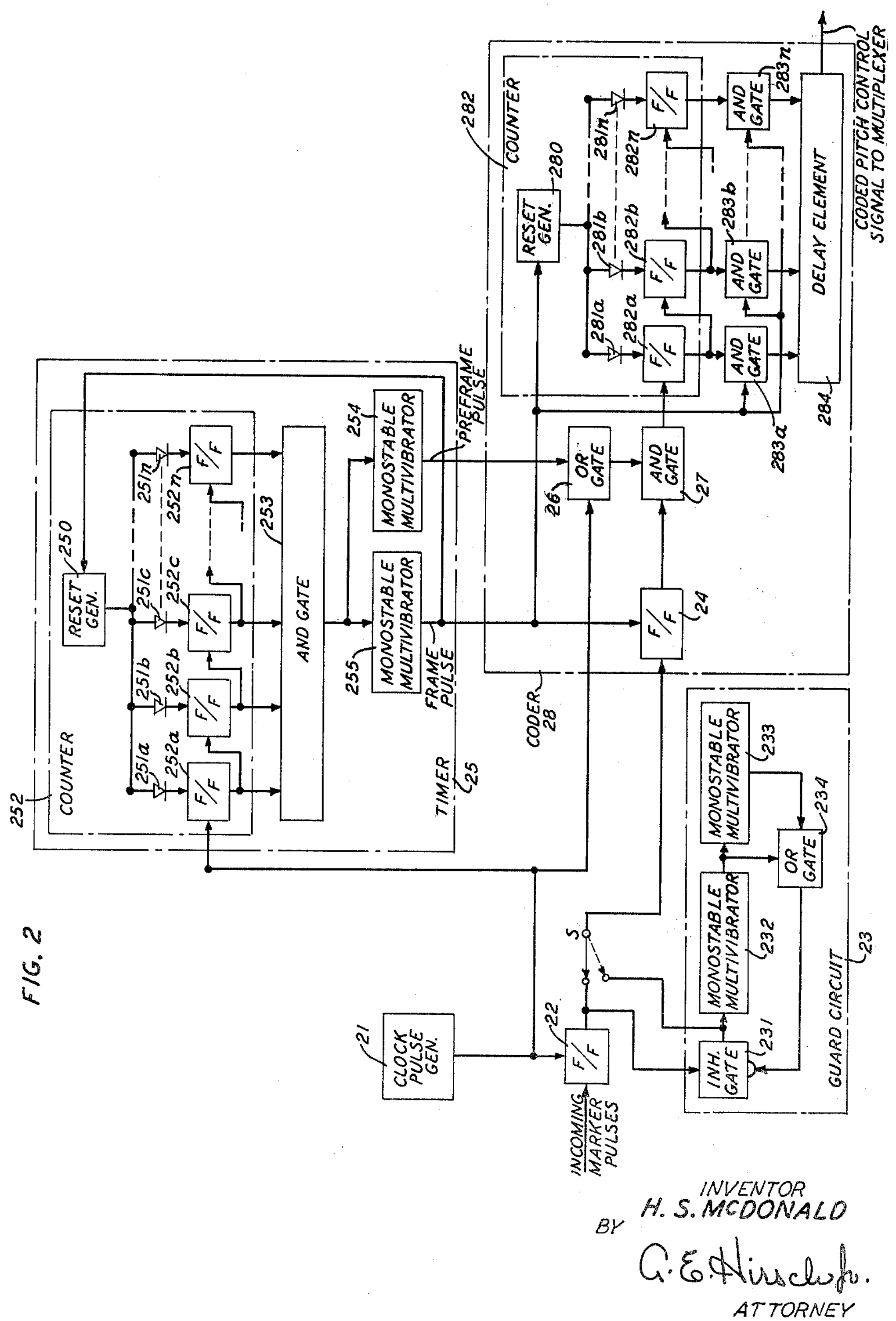
FIG. 2 is a schematic block diagram showing apparatus for quantizing and coding the marker pulse output of a pitch detector to form a pitch control signal.
Figures 6A, 6B, 6C, 7:
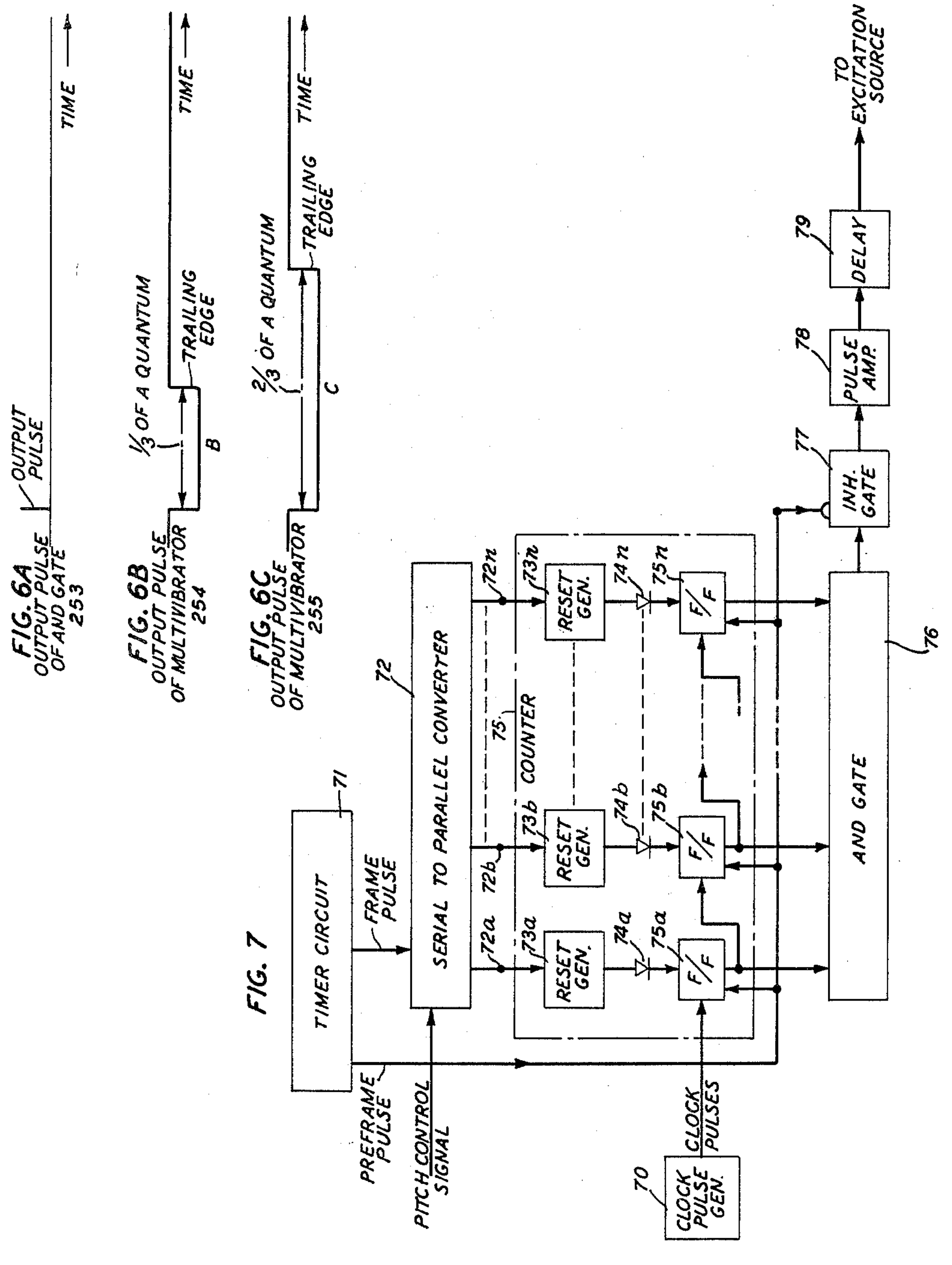

FIGS. 3A, 3B, and 3C are pulse diagrams of assistance in explaining the quantizing operation of flip-flop 22 of FIG. 2;

FIGS. 4A, 4B, 4C, and 4D are pulse diagrams of assistance in explaining the operation of guard circuit 23 of FIG. 2;

FIGS. 5A, 5B, 5C, and 5D are pulse diagrams of assistance in explaining the operation of coder 28 of FIG. 2;

FIGS. 6A, 6B, and 6C are pulse diagrams of assistance in explaining the operation of timer 25 of FIG. 2; and FIG. 7 is a schematic block diagram showing apparatus for decoding the pitch control signal produced by the apparatus of FIG. 2 to generate a train of artificial marker pulses.

*Complete System*

Figure 1:
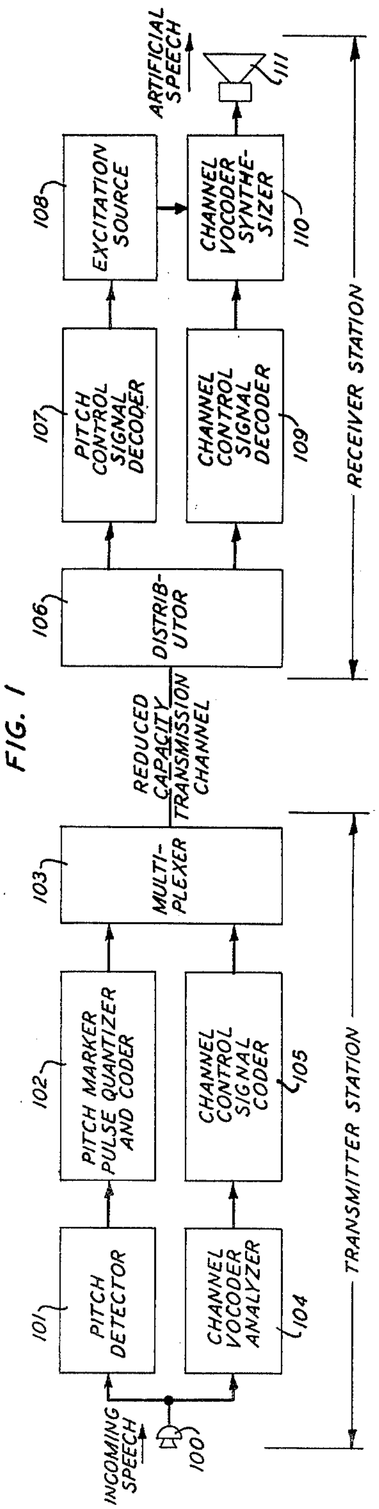
FIG. 1 is a schematic block diagram showing a complete channel vocoder system embodying the apparatus of this invention.

Referring first to FIG. 1, the apparatus of this invention is shown incorporated in a conventional channel vocoder of the type described in the aforementioned Dudley patent. At the transmitter station, an incoming speech wave from microphone 100 is applied in parallel to conventional pitch detector 101 and to analyzer 104 of a well-known channel vocoder. Part of the novel apparatus of this invention, as represented by element 102, quantizes and codes the marker pulse output of pitch detector 101 to form a pitch control signal. A detailed explanation of the operation and structure of pitch marker pulse quantizer and coder 102 is given below in connection with the description of FIG. 2. The vocoder channel control signals produced by analyzer 104 are encoded by coder 105 in a suitable form for transmission; for example, they may be encoded in a pulse code. The coded pitch control signal and the coded channel control signals are multiplexed for transmission by multiplexer 103, of a suitable variety, and transmitted over a reduced capacity transmission channel to a receiver station. At the receiver station, conventional distributor 106 passes the pitch control signal to novel decoder 107 of this invention, which is described in detail below in connection with FIG. 7, and passes the coded channel control signals to decoder 109, which may be of any well-known construction appropriate to the particular code employed by coder 105 at the transmitter terminal. Decoder 107 derives from the pitch control signal a train of artificial marker pulses whose repetition rate is equal to the instantaneous fundamental pitch frequency of the talker's voice. Excitation source 108, containing, for example, well-known buzz and hiss sources, derives from this train of artificial marker pulses an excitation signal for use in synthesizer 110. Synthesizer 110 reconstructs an artificial speech wave from the excitation output signal of source 108 and from the decoded channel control signals of decoder 109, and reproducer 111 converts the artificial speech wave output of synthesizer 110 into natural sounding speech.

*Quantizer and Coder*

Referring now to FIG. 2, a preferred embodiment of pitch marker pulse quantizer and coder 102 of FIG. 1 is illustrated. Incoming marker pulses from a conventional pitch detector, for example, pitch detector 101 of FIG. 1, are applied to one input terminal of flip-flop 22, of any suitable construction, which time quantizes the marker pulses by generating an output pulse at the first standard clock time following each incoming marker pulse. Standard clock times are established by applying clock pulses from conventional clock pulse generator 21 to the second input terminal of flip-flop 22, thereby dividing the real time scale into time intervals or quanta of uniform length, as shown by clock pulses B10, B11, B12, and B13 in FIG. 3B. The clock pulses applied to the second input terminal of flip-flop 22 serve to change the condition of flip-flop 22 from stable condition "zero" to stable condition "one." Correspondingly, incoming marker pulses change the condition of flip-flop 22 from stable condition "one" to stable condition "zero." As illustrated in FIGS. 3A, 3B, and 3C, when a typical marker pulse A1 is applied to flip-flop 22 while in condition "one," the change to condition "zero" causes the leading edge of output pulse C1 to appear at the output terminal of flip-flop 22. The next succeeding clock pulse, B12, changes the condition of flip-flop 22 back to "one," and terminates the output pulse formed at the output terminal of flip-flop 22. As shown in FIG. 3C, the positive-going trailing edge of output pulse C1 coincides with clock pulse B12. By utilizing the positive-going trailing edge of each output pulse of flip-flop 22 to identify the occurrence of a marker pulse within the preceding time quantum, each marker pulse is thereby time quantized; that is, regardless of where a marker pulse may occur within a quantum, the trailing edge of the corresponding output pulse of flip-flop 22 occurs at a standard clock time. Accordingly, the positive-going trailing edges of the output pulses of flip-flop 22 shall be referred to hereinafter as quantized marker pulses.

The lengths of the time quanta are uniform and may be selected to suit a particular application of this invention. It has been experimentally determined that time quanta on the order of 100 microseconds in length, corresponding to a clock pulse rate of 10,000 pulses per second, introduce no noticeable distortion in the reconstructed speech. Intelligible speech may be reproduced, however, with time quanta on the order of 200 microseconds in length, corresponding to a clock pulse rate of 5,000 pulses per second.

The quantized marker pulse output of flip-flop 22 is passed to coder 28, either directly or through guard circuit 23, which is described in detail below, depending upon the position in which switch S is set. The operation of coder 28, however, is unaffected by the position of switch S.

Since the quantized marker pulse output of flip-flop 22 coincides with the clock pulse output of generator 21, the pulse rate of the quantized marker pulses is equal to that of the clock pulses. Even at a pulse rate as low as 5,000 pulses per second, direct transmission of the quantized marker pulses would require an expensive, large capacity transmission channel. The quantized marker pulses may be economically transmitted over a relatively small capacity transmission channel, however, by encoding them in a pulse code whose pulse rate is slow compared to the pulse rate of the uncoded quantized marker pulses.

The quantized marker pulses are encoded by dividing the train of quantized marker pulses into frames such that not more than one quantized marker pulse will occur in each frame. By making the length of each frame equal to $2^n-1$ quanta, it is well known that each quantum from the first to the $(2^n-1)$th may be unambiguously identified by a binary number composed of $n$ binary digits or bits, 0 and 1, or in pulse form, by a group of $n$ on-off pulses. Since the time of occurrence of each quantized marker pulse is associated with a particular quantum, each quantized marker pulse is also specified by an $n$-bit code per frame of $2^n-1$ quanta. The pulse rate necessary for transmission of the quantized marker pulses in pulse code form is thereby reduced from the original clock pulse rate by a factor $$\frac{n}{2^n-1}$$

thus permitting the use of an economical, relatively small capacity transmission channel.

The length of each frame depends upon the upper limit of the range of fundamental pitch frequencies which it is desired to specify accurately. For example, a range of pitch frequencies with an upper limit of 300 cycles per second will produce marker pulses that recur at intervals as short as 3.33 milliseconds. In order that not more than one such marker pulse shall occur in each frame under normal conditions, the frames must be shorter than 3.33 milliseconds in length. For a clock pulse rate of 10,000 pulses per second and therefore quanta of 0.1 millisecond in length, this means that each frame must be less than 34 quanta in length. If a frame length of 31 such quanta is utilized, then $2^5-1=31$ and the occurrence of each marker pulse in a frame is unambiguously specified by coding it in terms of a group of 5 binary digits or a train of 5 on-off pulses per frame. The pulse rate necessary to transmit the quantized marker pulses in a 5-bit code is thus reduced from 10,000 pulses per second in uncoded form to $$\frac{5}{31}\times 10{,}000=1631 \text{ pulses per second}$$

in coded form.

Figure 5A:
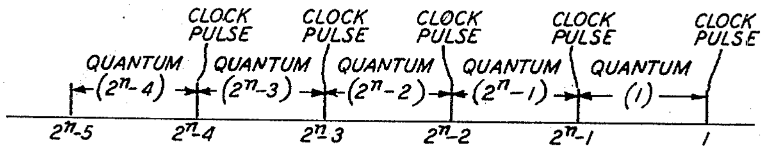
Figure 5B:
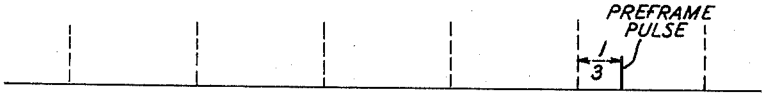
Figure 5C:
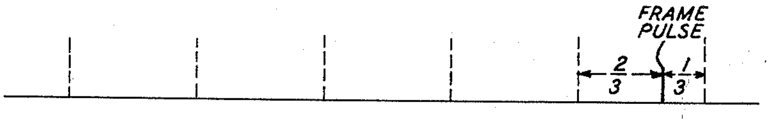
Figure 5D:
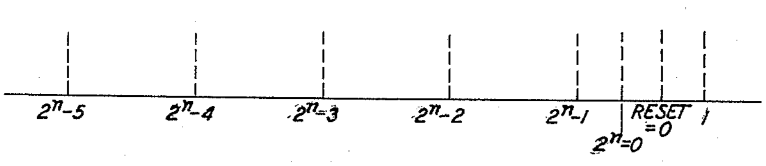

Coder 28 divides the train of quantized marker pulses into frames and encodes the location within a frame of each quantized marker pulse. Coder 28 contains a well-known binary counter 282, composed of $n$ binary stages, for example, flip-flops 282*a* through 282*n* connected in cascade, which counts pulses applied to its input terminal. Counter 282 counts from 1 to $2^n=0$, and as shown in FIGS. 5A, 5C, and 5D, is reset to 0 two-thirds of a quantum after the end of each frame of $2^n-1$ quanta by a frame pulse from timer 25 applied to reset generator 289 acting through diodes 281*a* through 281*n*. As shown in FIGS. 5B and 5C, timer 25, which is described in detail below, generates two signals at the end of each frame of $2^n-1$ quanta, a preframe pulse occurring one-third of a time quantum after each $(2^n-1)$th clock pulse, and a frame pulse occurring two-thirds of a time quantum after each $(2^n-1)$th clock pulse. The frame pulse is also applied to flip-flop 24, thereby enabling AND gate 27 and passing clock pulses applied to OR gate 26, for example, a well-known buffer circuit, from generator 21 to the input terminal of counter 282. Counter 282 stops counting during a frame when a first quantized marker pulse occurring in a frame is applied to flip-flop 24, thus disabling AND gate 27 and blocking the passage of both clock pulses and spurious quantized marker pulses to counter 282 for the remainder of the frame. Counter 282 does not start counting again until after the frame has ended, when the frame pulse resets the counter to 0 and enables AND gate 27. The last clock pulse to be counted before AND gate 27 is disabled during a frame is the same clock pulse that terminated the output pulse of flip-flop 22 and thereby gave rise to the quantized marker pulse; hence the number of clock pulses counted by counter 282 during each frame indicates the quantum of the frame in which a marker pulse occurred.

After the $(2^n-1)$th clock pulse, the frame pulse simultaneously enables gates 283*a* through 283*n* in order to pass the parallel count condition of counter 282 at the time it stopped counting during the preceding frame to the taps of well-known delay element 284. Delay element 284 converts the parallel count condition of counter 282 into a serial train of pulses in which there are $n$ time slots, one for each binary digit. A pulse in a specific time slot indicates the digit 1 and the absence of a pulse indicates the digit 0. The serial pulse train output of delay element 284 thus represents in binary pulse code form the quantum in which a marker pulse occurred within a given frame, and this pulse train constitutes the pitch control signal of the present invention. The pitch control signal is passed from delay element 284 to a suitable multiplexer, as shown in FIG. 1, and from there it is transmitted, together with the coded channel control signals, over a narrow capacity channel to the receiver station, where it is decoded to form a train of artificial marker pulses for use in the reconstruction of natural sounding speech.

The pitch control signal derived in the above fashion accurately indicates the occurrence of a marker pulse anywhere within the first $2^n-2$ quanta of a frame. In order to distinguish unambiguously between the occurrence of a marker pulse in the $(2^n-1)$th quantum of a frame and the nonoccurrence of a marker pulse anywhere within a frame, however, a special code provision is required, since the count condition of counter 282 is $2^n-1$ in both of these situations. To prevent this ambiguity, the present invention uses the number 0, the $2^n$th binary number of possible with an $n$-bit code, to indicate the nonoccurrence of a marker pulse within a frame, and uses the number $2^n-1$ to indicate the occurrence of a marker pulse in the $(2^n-1)$th quantum. This is achieved by applying a preframe pulse generated by timer 25 to OR gate 26 one-third of a quantum after the $(2^n-1)$th clock pulse, as shown in FIGS. 5A and 5B. If no marker pulse has occurred in the frame, the preframe pulse passes through AND gate 27 to advance counter 282 from count condition $2^n-1$ to count condition $2^n=0$, as shown in FIG. 5D. If, however, a marker pulse has occurred anywhere within the frame, then AND gate 27 is disabled and the preframe pulse is blocked; counter 282 then remains in its last count condition until the occurrence of the frame pulse, at which time counter 282 is reset to 0. Thus, at the end of a frame, a count other than 0 indicates the occurrence of a marker pulse within the preceding frame, whereas the count $2^n=0$ indicates the nonoccurrence of a marker pulse within the preceding frame. Accordingly, at the receiver the decoder apparatus of this invention, as described below, generates artificial marker pulses only for pulse code numbers other than 0.

*Timer*

Timer 25 of FIG. 2 derives from the clock pulse output of clock pulse generator 21 a preframe pulse and a frame pulse at the end of every frame as measured by successive $(2^n-1)$th clock pulses. Timer 25 contains a well-known binary counter 252, composed of $n$ binary stages, for example, flip-flops 252*a* through 252*n* connected in cascade, which counts in parallel binary form clock pulses applied to its input terminal from generator 21. Counter 252 counts from 1 to $2^n-1$, and is reset to 0 by the frame pulse applied to reset generator 250 acting through diodes 251*a* through 251*n*. The output terminals of flip-flops 252*a* through 252*n* are connected to the control terminals of AND gate 253, and when all of the flip-flops 252*a* through 252*n* are in the "one" condition, indicating that $2^n-1$ clock pulses have been counted, AND gate 253 is enabled and a pulse appears at its output terminal. The output terminal of AND gate 253 is connected to the input terminals of monostable multivibrators 254 and 255, and the output pulse of AND gate 253 triggers multivibrators 254 and 255 to their unstable states. As shown in FIGS. 6B and 6C, pulses B and C appear at the output terminals of multivibrators 254 and 255 when they are in their monostable states, respectively, where the duration of the unstable state of multivibrator 254 is selected to be one-third of a quantum, while the duration of the unstable state of multivibrator 255 is selected to be two-thirds of a quantum. The trailing edge of the output pulse, B, of multivibrator 254 forms the preframe pulse, and the trailing edge of the output pulse, C, of multivibrator 255 forms the frame pulse. As illustrated in FIGS. 5B and 5C, the frame pulse follows the preframe pulse by one-third of a quantum and precedes the first clock pulse of the next frame by one-third of a quantum. It is noted that an original marker pulse occurring in the first time quantum of a frame does not interfere with the preframe and frame pulses, since the time of occurrence of the quantized marker pulse derived from this original marker pulse coincides with the first clock pulse of the frame.

*Guard Circuit*

Guard circuit 23 of FIG. 2 eliminates spurious marker pulses by blocking the passage of those quantized marker pulses which follow a preceding quantized marker pulse within a predetermined inhibition time interval, T seconds. Since the marker pulses are almost periodic, spurious marker pulses are those which follow a preceding pulse too closely. For example, a pitch frequency of 300 cycles per second produces marker pulses spaced at intervals of approximately 3.33 milliseconds, and those pulses following a preceding pulse at shorter intervals are spurious and should be eliminated to prevent errors in the pitch of the reconstructed speech. The inhibition time interval, T seconds, during which pulses following a preceding pulse are blocked is determined by the highest pitch frequency to be accurately reproduced, since the marker pulses will be most closely spaced at this frequency. Thus, for example, if 300 cycles per second is the highest pitch frequency to be accurately reproduced, an inhibition time interval greater than 3.33 milliseconds will satisfactorily eliminate spurious marker pulses.

Figure 4A:
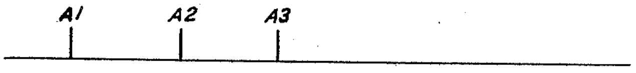
Figure 4B:
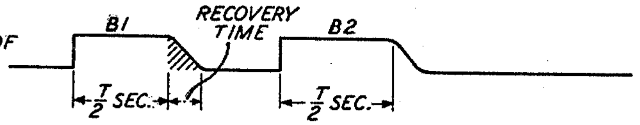
Figure 4C:
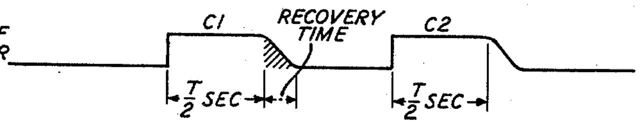
Figure 4D:
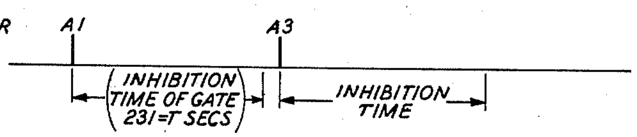

As shown in FIG. 2 and in FIGS. 4A and 4D, a first quantized marker pulse A1 from flip-flop 22 applied to inhibit gate 231 of guard circuit 23 is passed to conventional monostable multivibrator 232 and through switch S to coder 28. As shown in FIG. 4B, marker pulse A1 triggers multivibrator 232 to its unstable state, causing pulse B1 to appear at its output terminal. The output terminal of multivibrator 232 is connected to one input terminal of OR gate 234, which passes pulse B1 to inhibit gate 231. Pulse B1 acts as in inhibitory control signal to disable gate 231 for the duration of pulse B1, $$\frac{T}{2} \text{ seconds}$$

during which time no marker pulses from flip-flop 22 are passed to coder 28. The output terminal of multivibrator 232 is also connected to the input terminal of monostable multivibrator 233, and the termination of the unstable state of multivibrator 232 and of output pulse B1 triggers multivibrator 233 to its unstable state, causing pulse C1 to appear at the output terminal of multivibrator 233, as shown in FIG. 4C. The output terminal of multivibrator 233 is connected to the second input terminal of OR gate 234, which passes pulse C1 to AND gate 231 immediately following pulse B1. Pulse C1 also acts as an inhibitory control signal to disable gate 231 for the duration of pulse C1, $$\frac{T}{2} \text{ seconds}$$

during which time no marker pulses from flip-flop 22 are passed to coder 28. The two multivibrators in series thus act to inhibit the transmission of marker pulses by gate 231 for a time T seconds, which is obtained by selecting the duration of the unstable state of each multivibrator to be one-half the desired inhibition time interval. Two multivibrators are used in series in order to prevent erratic operation due to the occurrence of a marker pulse during the recovery of a single multivibrator from its unstable state, shown by the shaded areas in FIGS. 4B and 4C. By using two multivibrators in series, the guard circuit in effect has no recovery time because the second multivibrator 233 is in its unstable state during the recovery time of the first multivibrator 232, and the first multivibrator 232 has fully recovered from its unstable state by the time multivibrator 233 starts to recover. For example, spurious quantized marker pulse A2 of FIG. 4A, occurring during the recovery time of multivibrator 232 as shown in FIG. 4B, is blocked by gate 231 due to the output pulse C1 produced by the unstable state of multivibrator 233, as shown in FIGS. 4C and 4D, while true quantized marker pulse A3, occurring during the recovery time of multivibrator 233 is passed by gate 231, as shown in FIG. 4D, and immediately starts a new inhibition time cycle for gate 231, as shown by pulses B2 and C2 of FIGS. 4B and 4C.

*Decoder*

After transmission over a narrow-band channel to a receiver station, the multiplexed pitch and channel control signals are separated by a distributor, as shown by element 166 of FIG. 1, and applied to their respective decoders. FIG. 7 shows a preferred embodiment of the decoder of this invention, which derives artificial marker pulses from the incoming pitch control signal.

With reference to FIG. 7, the serial pulse train of the pitch control signal is applied, together with a frame pulse, to serial-to-parallel converter 72, for example, a conventional shift register. The frame pulse is generated by timer circuit 71, which is identical in construction to timer 25 of FIG. 2. At the end of each frame, as determined by the frame pulse, the serial train of pulses making up the pitch control signal appears as a parallel pulse-no pulse pattern at output terminals **72*a* through 72*n* of shift register 72**. This parallel pulse-no pulse pattern indicates in binary form whether or not a marker pulse occurred in the preceding frame, and if one did occur, the number of the quantum in which the marker pulse occurred, in accordance with the code described above.

Terminals **72*a* through 72*n* are connected to flip-flops 75*a* through 75*n* of counter 75 via reset generators 73*a* through 73*n* and diodes 74*a* through 74*n*. Counter 75 counts clock pulses from clock pulse generator 70, which is synchronized with the clock pulse generator at the transmitter station. A preframe pulse from timer circuit 71 is applied in parallel to flip-flops 75*a* through 75*n* of counter 75. The operation of counter 75** is as follows:

At the end of each frame, the preframe pulse sets all of the flip-flops of counter 75 to the "one" condition so that the count condition of counter 75 is $2^n-1$. The frame pulse, which follows the preframe pulse by one-third of a quantum, is applied to converter 72 and causes the serial pulse train of the pitch control signal to appear as a parallel pulse-no pulse pattern at terminals **72*a* through 72*n* of converter 72. Each flip-flop of counter 75 which is connected to a terminal of converter 72 at which a pulse appears is reset to the "zero" condition by its associated reset generator. Thus, just before the first clock pulse of each frame, the count condition of counter 75 is the so-called ones complement of the binary number transmitted as the pitch control signal; that is, if $x$ is the transmitted binary number, then $(2^n-1)-x$ is the count condition of counter 75** just before the first clock pulse of each frame, which is equal to the definition of the ones complement, $(2^n-x)-1$, of the binary number $x$.

The output terminals of flip-flops **75*a* through 75*n* are connected to the input terminals of AND gate 76 in conventional manner in order to cause a pulse to appear at the output terminal of gate 76 whenever all the flip-flops are in the "one" condition, that is, whenever the count condition of counter 75 is $2^n-1$. Thus, by setting the count condition of counter 75 to be $(2^n-1)-x$ just before the first clock pulse of each frame, where $x$ is the transmitted binary number, $x$ clock pulses are required to advance counter 75 to count condition $2^n-1=(2^n-1)-x+x$ and thereby produce a pulse at the output terminal of gate 76. The time position of the output pulse of gate 76 within the frame reconstructed at the receiver station is therefore identical to the time poistion of the quantized marker pulse within the original frame at the transmitter station. It is noted that if no marker pulse occurred within the original frame at the transmitter station, no output pulse is produced during the frame reconstructed at the receiver station, since the count condition of counter 75 just before the first clock pulse is $(2^n-1)-0=2^n-1$, the first clock pulse advances the counter to $2^n=0$, the last or $(2^n-1)$th clock pulse of the frame advances the counter to $2^n-2$, after which the preframe pulse sets counter 75 to $2^n-1$ for the next frame, and no pulse is formed at gate 76 during the frame. Since an output pulse is formed at gate 76 each time that the preframe pulse sets counter 75 to count condition $2^n-1$, the output terminal of gate 76 is connected to inhibit gate 77**, which is disabled by the preframe pulse.

Each output pulse formed by gate 76 during a frame is passed by gate 77 to pulse amplifier 78, and the series of such pulses forms a train of artificial pitch marker pulses whose repetition rate closely follows that of the original pitch marker pulses and therefore the fundamental pitch frequency of the talker's voice. Although the reconstructed marker pulses lag the original marker pulses by one frame, this delay has no effect on the reconstructed speech, since there is an even greater delay in establishing the channel control signals at the channel vocoder synthesizer. Thus, the reconstructed marker pulses must be passed through delay element 79, of any suitable variety, in order to synchronize the artificial marker pulses with the channel control signals. The output terminal of delay element 79 is connected to an excitation source, which generates an excitation signal from the artificial marker pulses for use in the synthesis of artificial speech.

It is to be understood that the arrangements described above are merely illustrative of applications of the principles of the invention. Numerous other arrangements may be devised by those skilled in the art without departing from the spirit and scope of the invention.

What is claimed is:

1. Apparatus for improving the naturalness of speech produced by a narrow-band speech transmission system which comprises at the transmitter station a source of marker pulses whose repetition rate is equal to the fundamental pitch frequency of an incoming speech wave, means for quantizing the time of occurrence of each of said marker pulses, means for encoding the quantized times of occurrence of said marker pulses to form a pitch signal requiring a small transmission channel capacity, means for transmitting said pitch signal to a receiver terminal, and, at said receiver terminal, means for decoding said pitch signal to reconstitute said marker pulses.

2. In a system for improving the naturalness of speech produced by a channel vocoder, the combination which comprises a source of marker pulses whose repetition rate is equal to the fundamental pitch frequency of an incoming speech wave, means for deriving from the time of occurence of each of said marker pulses a time quantized pulse occurring at a standard clock time, means for deriving from said time quantized pulses a group of code pulses whose pulse rate is small compared to the pulse rate of said first group of pulses, means for transmitting said group of code pulses to a receiver station, and, at said receiver station, means for reconstructing from said group of code pulses a train of artificial marker pulses whose repetition rate closely follows that of said original marker pulses.

3. Apparatus for transmitting the information content of pitch marker pulses requiring a large capacity transmission channel over a small capacity transmission channel which comprises a source of pitch marker pulses, a source of clock pulses with a pulse rate of R pulses per second, means supplied with said pitch marker pulses and said clock pulses for deriving a group of time-quantized marker pulses having a pulse rate of R pulses per second, means for eliminating from said group of time-quantized pulses those pulses that follow a preceding quantized output pulse within a predetermined time interval, means for dividing said train of quantized marker pulses into frames each containing $2^n-1$ clock pulses, means for deriving for each of said frames a serial train of $n$ binary pulses representative of the location of each of said quantized marker pulses with respect to said frames, wherein said serial train of $n$ binary pulses per frame has a pulse rate of $$\frac{n}{2^n-1}\times R$$

pulses per second, means for transmitting each of said serial trains of pulses to a receiver station, and, at said receiver station, means for reconstructing from each of said serial trains of transmitted pulses an artificial pitch marker pulse.

4. In combination with a channel vocoder system, apparatus for transmitting the information content of pitch marker pulses requiring a large capacity transmission channel over a small capacity transmission channel which comprises a source of marker pulses whose repetition rate is equal to the fundamental pitch frequency of an incoming speech wave, a clock pulse generator for dividing the real time scale into time quanta of uniform, predetermined length, time-quantizing means supplied with said marker pulses and said clock pulses for generating a time-quantized output pulse in coincidence with the clock pulse next following each marker pulse, timing means connected to said clock pulse generator for developing at a first output terminal a preframe pulse one-third of a time quantum after the occurrence of every frame of $2^n-1$ clock pulses and at a second output terminal a frame pulse one-third of a time quantum after each preframe pulse, means connected to the output terminal of said time-quantizing means for suppressing quantized output pulses that follow a preceding quantized output pulse within a predetermined time interval, means for connecting the output terminal of said clock pulse generator, the output terminals of said timing means, and the output terminal of said suppressing means to a coding means for deriving for each frame of $2^n-1$ clock pulses a pulse code consisting of a serial train of $n$ binary pulses representative of the location of each quantized output pulse with respect to said frames, wherein the code numbers 1 through $2^n-1$ indicate the occurrence of a quantized output pulse in quanta 1 through $2^n-1$, respectively, of a frame, and the code number 0 indicates the nonoccurrence of a quantized output pulse in a frame, means for transmitting said code to a receiver station, and, at said receiver station, means for reconstructing from said pulse code artificial marker pulses whose repetition rate closely follows the repetition rate of the original marker pulses.

5. Apparatus as defined in claim 4 wherein said time-quantizing means comprises a bistable device which is changed from its first stable condition to its second stable condition by one of said marker pulses, and which is changed from its second stable condition to its first stable condition by one of said clock pulses.

6. Apparatus as defined in claim 4 wherein said timing means comprises a counter composed of $n$ binary stages, means for connecting said clock pulse generator to the input terminal of said counter, means for connecting the output terminals of the $n$ stages of said counter to a gating circuit, means for connecting the output terminal of said gating circuit in parallel to the input terminals of a first and a second monostable multivibrator, wherein the duration of the unstable state of said first monostable multivibrator is equal to one-third of a time quantum, and the duration of the unstable state of said second monostable multivibrator is equal to two-thirds of a time quantum, and means for connecting the output terminal of said second multivibrator to a reset generator for resetting said counter to count condition zero.

7. Apparatus as defined in claim 4 wherein said means for blocking the transmission of quantized output pulses that follow a preceding quantized output pulse within a predetermined time interval comprises a gating circuit provided with an input terminal, a control terminal, and an output terminal, means for connecting the output terminal of said time quantizing means to the input terminal of said gating circuit, means for connecting the output terminal of said gating circuit to the input terminal of a first monostable multivibrator, wherein the duration of the unstable state of said first monostable multivibrator is equal to one-half of said predetermined time interval, means for connecting the output terminal of said first monostable multivibrator to the input terminal of a second monostable multivibrator, wherein the duration of the unstable state of said second monostable multivibrator is equal to one-half of said predetermined time interval, means for connecting the output terminal of said first monostable multivibrator to one input terminal of a buffer circuit, means for connecting the output terminal of said second monostable multivibrator to a second input terminal of said buffer circuit, and means for connecting the output terminal of said buffer circuit to the control terminal of said gating circuit.

8. Apparatus as defined in claim 4 wherein said coding means comprises a bistable device provided with two input terminals and an output terminal, means for connecting the output terminal of said suppressing means to one input terminal of said bistable device, means for connecting the second output terminal of said timing means to the other input terminal of said bistable device, a buffer circuit provided with two input terminals and an output terminal, wherein one of said input terminals is connected to the output terminal of said clock pulse generator, and the other of said input terminals is connected to the first output terminal of said timing means, a gating circuit provided with two input terminals and an output terminal, means for connecting the output terminal of said bistable device to one input terminal of said gating circuit, means for connecting the output terminal of said buffer circuit to another input terminal of said gating circuit, a binary counter composed of $n$ binary stages, means for connecting the output terminal of said gating circuit to the input terminal of said counter, and means for converting the count condition of said counter at the end of each frame into a serial train of $n$ binary pulses.

9. Apparatus as defined in claim 4 wherein said means for reconstructing artificial marker pulses comprises means for converting the serial train of $n$ binary pulses of said pulse code to $n$ parallel binary pulses at said output terminals in response to said frame pulse, a binary counter composed of $n$ binary stages, means for connecting the output terminals of said converting means to the reset terminals of said counter, means for applying said preframe pulse to the $n$ binary stages of said counter to set said counter to count condition $2^n-1$ at the end of each frame, means for applying said clock pulses to the input terminal of said counter, a gating circuit connected to the output terminals of the $n$ binary stages of said counter, an inhibiting circuit provided with a control terminal, an input terminal, and an output terminal, means for connecting the output terminal of said gating circuit to the input terminal of said inhibiting circuit, means for applying said preframe pulse to the control terminal of said inhibiting circuit, a pulse amplifier provided with an input terminal and an output terminal, means for connecting the output terminal of said inhibiting circuit to the input terminal of said pulse amplifier, a delaying means, wherein the delay time of said delaying means is selected to synchronize said artificial marker pulses with the other signals developed in said channel vocoder system, and means for connecting the output terminal of said pulse amplifier to said delaying means.

10. Apparatus for encoding the times of occurrence of a sequence of marker pulses which comprises a source of a sequence of marker pulses having a nonuniform repetition rate, a source of a train of clock pulses having a uniform repetition rate, quantizing means supplied with said sequence of marker pulses and said train of clock pulses for producing for each of said marker pulses a time quantized pulse in time coincidence with the clock pulse next following said marker pulse, timer means supplied with said train of clock pulses for dividing said train of clock pulses into frames, each frame containing an equal number of clock pulses, and means connected to said timer means for generating from said clock pulses and said time quantized pulses a sequence of coded signals indicative of the positions of said time quantized pulses within a frame, whereby said coded signals have a lower repetition rate than said clock pulses.

11. Decoding apparatus for reproducing from a coded signal representing the time of occurrence of an original marker pulse within an original frame of $2^n-1$ time quanta consecutively numbered from 1 to $2^n-1$, where said coded signal represents in binary form the number, denoted x, of the particular time quantum of said original frame in which said original marker pulse occurred, an artificial marker pulse which occurs during an artificial frame of $2^n-1$ consecutively numbered time quanta within that time quantum having the same number as the time quantum of said original frame within which said original marker pulse occurred, which comprises counting means provided with a count condition capacity for indicating in binary form numbers up to and including $2^n-1$, means for setting the count condition of said counting means to indicate the number $2^n-1$ prior to the beginning of said artificial frame, means for applying said coded signal to said counting means at the beginning of an artificial frame, after the count condition of said counting means has been set to indicate the number $2^n-1$, to reset the count condition of said counting means to indicate the ones complement, $2^n-1-x$, of the binary number represented by said coded signal, means for advancing the ones complement count condition of said counting means a unit at a time as each time quantum of said artificial frame elapses, and means responsive to said counting means for generating an artificial marker pulse when the count condition of said counting means has been advanced from $2^n-1-x$ to $2^n-1$ at the lapse of the $x$th time quantum of said artificial frame.

References Cited in the file of this patent

UNITED STATES PATENTS

| | | |
|---|---|---|
| 2,850,574 | Kretzmer | Sept. 2, 1958 |
| 2,949,503 | Andrews et al. | Aug. 16, 1960 |
| 2,949,505 | Kretzmer | Aug. 16, 1960 |